S. P. M. TASKER.
Pipe-Coupling.

No. 202,384. Patented April 16, 1878.

Attests

Inventor
Stephen P. M. Tasker
By his Attorneys,

UNITED STATES PATENT OFFICE.

STEPHEN P. M. TASKER, OF PHILADELPHIA, PENNSYLVANIA.

IMPROVEMENT IN PIPE-COUPLINGS.

Specification forming part of Letters Patent No. 202,384, dated April 16, 1878; application filed March 12, 1878.

*To all whom it may concern:*

Be it known that I, STEPHEN P. M. TASKER, of the city and county of Philadelphia, in the State of Pennsylvania, have invented a new and useful Pipe-Coupling, of which I do hereby declare the following to be a full, clear, and precise description, and sufficient to enable those skilled in the art to which my invention relates to make and use the same, reference being had to the accompanying drawings, which form part of this specification, and of which—

Figure 1:
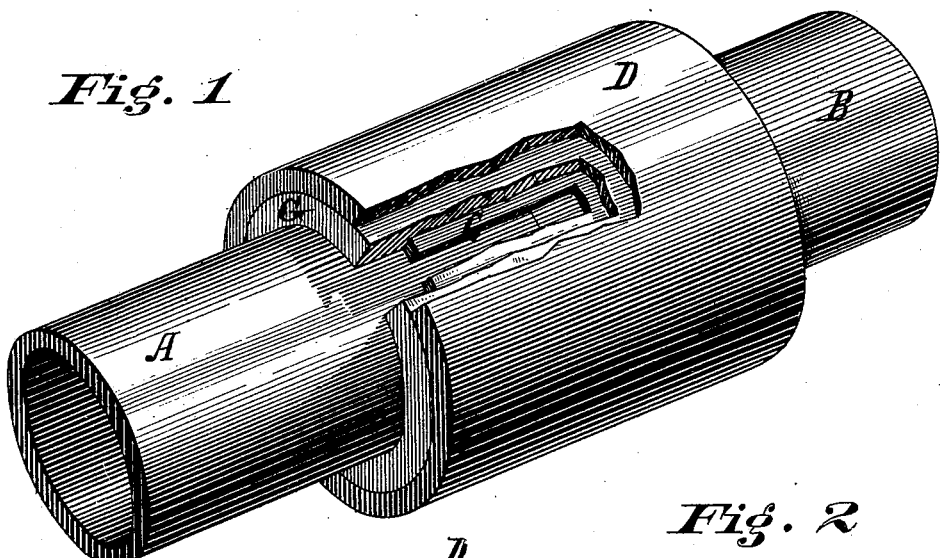
Figure 2:
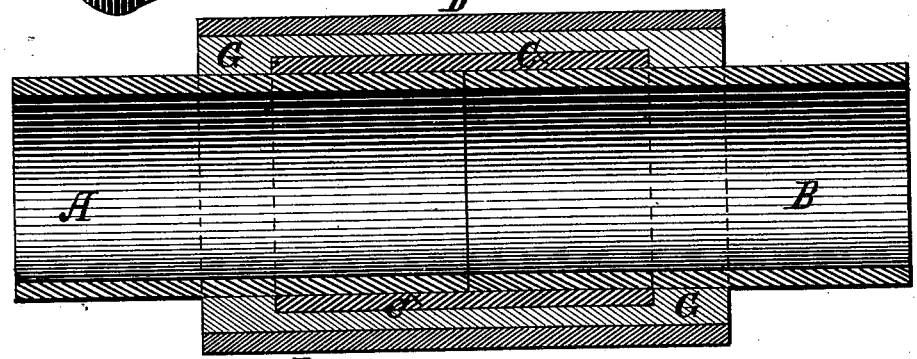
Figure 3:
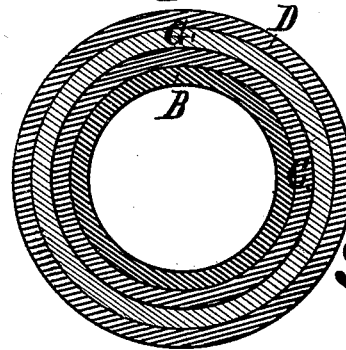

Figure 1 is a view, in perspective, of my coupling, the sleeve, solder, and binding-collar being partially broken through for clear illustration. Fig. 2 is a central longitudinal sectional elevation of the coupling, and Fig. 3 a transverse sectional elevation of the coupling through one section of pipe.

Similar letters of reference indicate corresponding parts wherever used.

My invention relates to the class of pipe joints or couplings in which the ends of the sections of pipe are of the same diameter and cut evenly off, so as to be brought butts together, and are then united by embracing devices, without screw-threads, expanded or socket ends, or the like.

It consists, substantially, in a pipe-coupling composed of a collar jammed upon the ends of pipe-sections of even diameter, of a sleeve surrounding the whole in such manner as to leave an annular interspace between, and an intermediate layer of solder, adapted to unite and hermetically seal the whole.

Referring to the drawings, A B represent two sections of pipe. The ends to be coupled are of the same diameter, and are evenly cut, so as to come to a butt-joint.

C is a binding-collar—a cylinder of metal, of interior diameter sufficient to jam onto the ends of the pipe. D is a sleeve, sufficiently larger in diameter than the collar to leave an annular interspace between when the sleeve is placed around the collar, and longer than the latter, so as to overlap it at both ends.

In order to couple the pipe, when the ends of the sections have been jammed into the collar, the sleeve is held concentrically around the whole, and molten lead, solder, or other fit material, G, poured between, so as to completely fill the annular interspace between the sleeve and collar, and between the sleeve and sections of pipe at the ends of the sleeve beyond the collar.

It will be understood that the collar, being jammed upon them, itself braces the ends of the pipe together, while the sleeve, when held in place by the solder, acts as an additional brace, and binds the whole firmly together; and the solder, uniting the sleeve not only to the collar, but also to the sections of the pipe, retains the collar endwise in position, and serves to hermetically seal the joint.

Having thus described my invention, I claim and desire to secure by Letters Patent of the United States—

The pipe-coupling hereinbefore described, which consists in a collar jammed upon the ends of the pipe, a sleeve surrounding the whole in such manner as to leave an annular interspace between, and an intermediate layer of solder, adapted to unite and hermetically seal the whole, substantially as described.

In testimony whereof I have hereunto signed my name this 9th day of March, 1878.

STEPHEN P. M. TASKER.

In presence of—
J. BONSALL TAYLOR,
R. M. HUNTER.